Sept. 28, 1965 K. N. BURNS ETAL 3,209,250
APPARATUS AND METHOD FOR INVERSE FOURIER
ANALYSIS OF ELECTRICAL TRANSIENTS
Filed Oct. 26, 1959 4 Sheets-Sheet 1

Kay N. Burns
Wallace L. Ikard
Jesse D. Skelton   Inventors
By James E. Reed   Attorney Kay N. Burns
Wallace L. Ikard
Jesse D. Skelton      Inventors By James E. Reed      Attorney

United States Patent Office 3,209,250
Patented Sept. 28, 1965

3,209,250
APPARATUS AND METHOD FOR INVERSE FOURIER ANALYSIS OF ELECTRICAL TRANSIENTS
Kay N. Burns, Tulsa, Okla., Wallace L. Ikard, Alexandria, Va., and Jesse D. Skelton, Tulsa, Okla., assignors, by mesne assignments, to Esso Production Research Company, Houston, Tex., a corporation of Delaware
Filed Oct. 26, 1959, Ser. No. 848,643
10 Claims. (Cl. 324—77)

The present invention relates to the analysis of electrical transients and more particularly relates to methods and apparatus for analyzing complex electrical signals to determine their frequency components and the relative phases of such components.

The analysis of complex waveforms in order to determine their frequency components and relative phases is required in many applications of electronics. Instances where it is frequently necessary to make such analyses include, for example, the study of noise and interference encountered with automatic control systems used in aircraft, missiles and the like; the investigation of methods and apparatus for propagating speech and sounds of similar character; and the interpretation of information recorded in the form of electrical transients during seismic prospecting for underground deposits of oil, gas and other minerals. Analytical work of this type involves resolution of the complex signal under investigation into a fundamental sine wave having certain frequency characteristics and a series of harmonics whose frequencies are multiples of that of the fundamental wave.

This resolution of the original waveform into its frequency components is normally accomplished by means of mathematical relationships referred to as the Fourier equations. The application of these equations is time consuming and requires that the signal to be analyzed be digitized so that the equations can be programmed in a digital computer or that a curve representative of the signal be prepared and followed manually with a mechanical integrator. Neither of these alternatives is attractive.

The present invention provides an improved method and apparatus for rapidly carrying out Fourier analyses for all intervals of a complex electrical signal or for fixed intervals during the duration of such a signal. In accordance with the invention, complex signals are analyzed for their frequency content by reproducing the frequency components of such signals through operations carried out in the time domain. The nature of these operations can be best understood by first considering the relationship of time and frequency in a frequency selective electrical system.

Any periodic electrical transient fed into an electrical system can be broken down into its various frequency components, the fundamental frequency and the harmonics, by means of the Fourier series. The effect of the system upon such a transient can be determined by determining the system's effect upon each of the individual frequencies and then adding the responses representing the modified components. If the signal being analyzed is nonperiodic, rather than periodic, the Fourier integral must be employed to perform the addition in order that the frequency spectrum of the signal may be specified. The result in either case is an output signal which represents a summation of the individual frequency components as modified by the system. This is in effect a superposition of frequency effects. Such an operation can be represented by the expression $F(w) \times G(w) = R(w)$; where $F(w)$ is the input signal as a function of frequency, $G(w)$ is the network function in terms of frequency and $R(w)$ is the output response as a function of frequency. Every signal which can be expressed as a function of frequency can also be expressed in corresponding terms as an equivalent function of time. In like manner, the network function of any system as a function of frequency has its equivalent function of time which also defines the characteristics of the network. In most situations calling for the analysis of an electrical system, the input signal as a function of time and the network function in terms of frequency are known and it is desired to determine the output of the system as a function of time. Since time and frequency functions cannot be intermixed, the desired determination is normally made by converting the input signal to a frequency basis, multiplying the individual frequency components of the input signal by the network effect in terms of frequency, totaling these effects to obtain an overall system response in terms of frequency, and then converting this response back to a time basis. The Fourier transforms which express the relationship between a phenomenon as a function of frequency and the same phenomenon as a function of time are used to convert from one basis to the other. These transforms are as follows:

(1) $$F(w) = \int_{-\infty}^{\infty} f(t) e^{-iwt} dt$$

(2) $$f(t) = \frac{1}{2}\int_{-\infty}^{\infty} F(w) e^{iwt} dw$$

where $F(w)$ is the phenomenon under consideration expressed in terms of frequency; $f(t)$ is the corresponding time function; $w$ is the angular velocity of the generating vector of the function and equals $2\pi f$ where $f$ is signal frequency; and $t$ is time. Equation 1 is a complex integral giving $F(w)$ when $f(t)$ is known; Equation 2 is a complex integral giving $f(t)$ when $F(w)$ is known. From these equations it can be determined that for a given $f(t)$, which must be real in physical systems, $F(w)$ has certain characteristics as follows:

(1) The amplitude of $F(w)$ is an even function of $w$.
(2) The phase of $F(w)$ is an odd function of $w$.
(3) The real part of $F(w)$ is an even function of $w$.
(4) The imaginary part of $F(w)$ is odd.

Use of the transforms with knowledge of these characteristics permits conversions to be made from a time to a frequency basis and from a frequency to a time basis. As mentioned earlier, however, the transforms are difficult to use and involve utilization of a digital computer or mechanical integrator if they are to be readily applied.

It can be shown mathematically that the network function of a system with respect to time is the output response of the system when the input signal in terms of frequency is unity. The input time function of a system which makes the input frequency function unity is known as the Delta or Dirac function and is defined as an impulse having an infinitesimally small width and infinite height, so that the product is unity. Although such a function cannot be exactly produced, it can be closely approximated. Since all physical systems are band limited and cover only a lower portion of the frequency range, it is only necessary that the input impulses be of short enough duration to have frequency components over and above the pass band limits of the system under consideration. The response of a system when such a short duration pulse is applied to the input is then the network function of the system in terms of time.

Knowledge of the input function and the network function of an electrical system in terms of time permits determination of the output response of the system without transposition into the frequency domain. Each impulse applied to the system causes the initiation of an individual impulse response whose characteristics are determined by the network function of the system. After several such impulses have been applied to the system, the resulting output response at any later time can be determined by totaling the effects of all the impulses which have occurred up to that time. If the individual impulses applied to the system are brief enough, the output response of the system can be considered to be the integral of the input function between limits of plus and minus infinity multiplied by the input impulse response shifted in time and reversed in direction. This results in superposition of all of the impulse responses which have resulted from impulses in past time. Operations thus making use of time rather than frequency functions are referred to as time domain operations in order to distinguish them from ordinary operations carried out in the frequency domain. This summation of effects in the time domain is expressed by the convolution integral $$r(t) = \int_0^t f(t)g(t-t)dt$$

The function $r(t)$ is the Fourier transform of $$R(w) = F(w) \times G(w)$$

Superpositioning of impulse responses in the time domain is utilized for analyzing electrical transients in accordance with the present invention by considering a characteristic of the function to be analyzed as a system impulse response and weighting samples of an input signal in accordance with that response at regular delayed time intervals. The frequency whose period is equal to this time interval must exceed the highest frequency in the input signal by a factor of at least two. By mixing the delayed signal thus weighted, a composite output signal whose frequency is the same as that of the applied signal and which represents the component of the original function having that frequency is obtained. The equivalent amplitude and phase of this output signal can readily be measured by means of an oscilloscope or an amplitude meter and phase meter. The invention thus permits the analysis of complex signals without making use of the Fourier series or Fourier transformers and thus greatly simplifies the analytical procedure.

The method and apparatus of the invention can also be employed for carrying out a running frequency analysis of a complex nonperiodic signal by utilizing the complex signal as the input signal to the system, sampling the input signal voltage at regular delayed time intervals, and weighting the delayed samples thus obtained in accordance with characteristics of the particular frequency to be analyzed. In this latter operation, sine and cosine functions of the frequency of interest are employed as the system response and are used to weight delayed samples of the original signal voltage. The amplitude of the frequency component of interest is the square root of the sum of the squares of the two output signals thus obtained. The phase angle of the frequency of interest is found by using the relationship that the tangent of the phase angle is equal to the amplitude of the sine of the frequency of interest divided by the amplitude of the cosine of the frequency of interest.

Apparatus useful in sampling an input signal at delayed time intervals and weighting the delayed samples according to a predetermined system response, as well as other aspects of the invention, can be more readily understood by referring to the following detailed description of the method and apparatus employed in accordance therewith and to the accompanying drawing which illustrates the method and apparatus. In the drawing.

Figure 1:
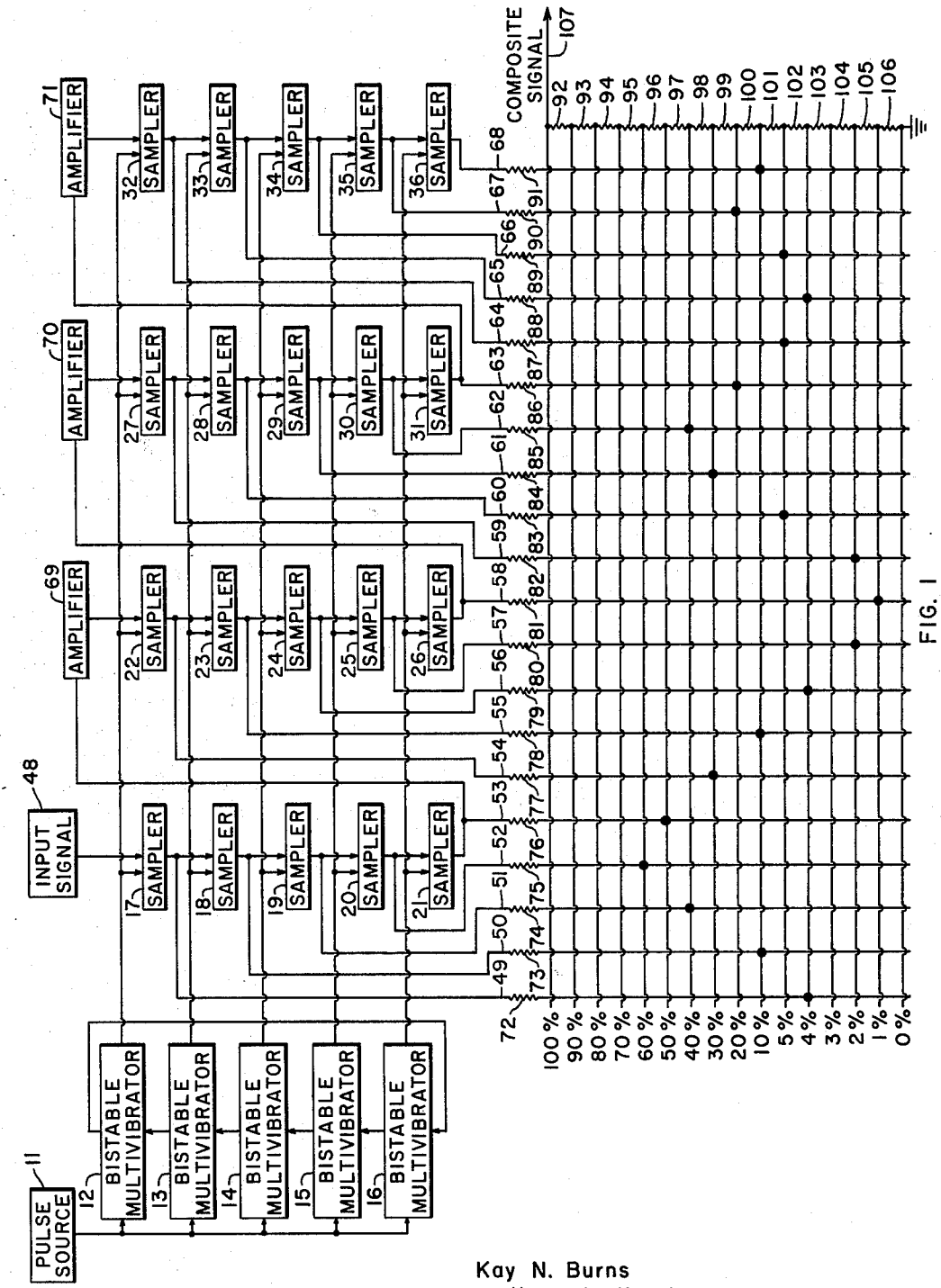
FIG. 1 is a schematic diagram of apparatus operating in the time domain useful in the practice of the invention.

Turning first to FIG. 1, the time domain unit disclosed therein consists essentially of a series of sampling circuits, counting circuitry used to trigger the sampling circuits, a source of impulses which actuate the counting circuitry, and means for weighting and mixing the voltage samples recovered by means of the sampling circuits. It will later become apparent to those skilled in the art that the particular time domain unit described in conjunction with FIG. 1 is not essential to the invention and that other time-domain units which operate in a manner generally analogous to that shown in FIG. 1 may be utilized.

Reference numeral 11 in FIG. 1 designates a source of sharply-peaked electrical impulses which serve to control the operation of the time domain unit. Normally source 11 will consist of a variable frequency pulse generator and, in some cases, depending on the generator's characteristics, a pulse shaper, but other sources of sharply-peaked impulses may be utilized. A number of pulse generators productive of suitable impulses are well known and will be familiar to those skilled in the electronic arts. The frequency of the pulses from source 11 precisely controls the sampling frequency of the time domain unit. The pulse frequency employed will therefore depend somewhat on the particular operation which is to be carried out and upon the characteristics of the input signal which is to be analyzed. For seismic applications of the apparatus of the invention, it is preferred that the frequency of the impulses from source 11 be variable over a range extending from about 100 cycles per second to about 10,000 cycles per second. For use in the analysis of signals having frequencies above the seismic range, higher pulse frequencies are desirable. The relationship between impulse frequency and the operation of the time domain unit depicted in FIG. 1 will be explained in detail hereafter.

The periodic electrical impulses emitted from source 11 are fed to a multistage, sequence-operated counting circuit, shown in FIG. 1 as a sequence-operated ring counter. The ring counter depicted is made up of interconnected bistable multivibrators 12, 13, 14, 15 and 16 which serve as gate generators to control the operation of the sampling circuits. The bistable multivibrators are conventional circuits having two stable states which complete one cycle for each two impulses received. Such circuits are commonly referred to as trigger circuits, Eccles-Jordan trigger circuits, or scale-of-two circuits. Each multivibrator in the ring operates in sequence as it receives an impulse from source 11 and an impulse from the multivibrator preceding it in the ring counter. The output from each multivibrator consists of a positive and a negative impulse which are used to trigger the operation of the sampling circuit of the apparatus. It will be understood that the use of a ring counter such as that shown in FIG. 1 may be dispensed with in favor of other sequence-operated counting devices. Gas-filled counting tubes such as the "Dekatron" and suitable auxiliary circuitry, mechanical commutator switches, and numerous other sequence-operated counting devices may be employed in lieu of the ring counter circuitry shown in FIG. 1. Such counting devices are widely used in radar systems, coder and decoder devices and many other applications and hence are well known in the art.

One or more sample-and-hold circuits, designated by reference numerals 17 through 36 in FIG. 1, is controlled by the output from each multivibrator in the ring counter circuit or similar counting device utilized in the apparatus. These sample-and-hold circuits may, so far as signal passage is concerned, consist essentially of two cathode follower stages which are activated upon receipt of positive and negative gating pulses from the appropriate multivibrator. Each sample-and-hold circuit samples the voltage of the input signal applied to it and holds that voltage for a discrete period of time, after which the voltage applied to the circuit is again sampled and held. The frequency with which this sampling occurs is determined by the frequency of the positive and negative impulses from the multivibrator to the sample-and-hold circuit. This latter frequency is in turn controlled by the frequency of the impulses from pulse source 11. The counting circuitry of the apparatus shown in FIG. 1 comprises a five-stage ring counter and hence each multivibrator in the counter operates at only one-fifth of the pulse frequency. The frequency with which samples are taken in the sample-and-hold circuits must be at least twice the highest frequency in the signal being analyzed. The frequency of the pulses emitted by source 11 in this particular apparatus must therefore be at least ten times the frequency of the highest frequency component of the signal being analyzed in this particular apparatus. It will be recognized that the apparatus is not restricted to the use of a five-stage counting circuit and that the relationship between the frequency of the pulses emitted from source 11 and the sampling frequency will change with changes in the number of stages in the counting circuitry.

Although a total of twenty sample-and-hold circuits are shown in the apparatus of FIG. 1, a greater or lesser number of circuits may be provided, depending upon the total delay period to be produced by the apparatus and the particular application to which the apparatus is to be put. It has been found that time domain units having 250 or more separate sampling stages are useful in the Fourier analysis of complex electrical signals. Such a unit may have an overall delay period of 500 milliseconds or more. In many if not most cases it will be found preferable to arrange these sampling stages in banks which can be interconnected to produce a unit having a large number of sampling stages or disconnected when only a small number of sampling stages are required.

Figure 2:
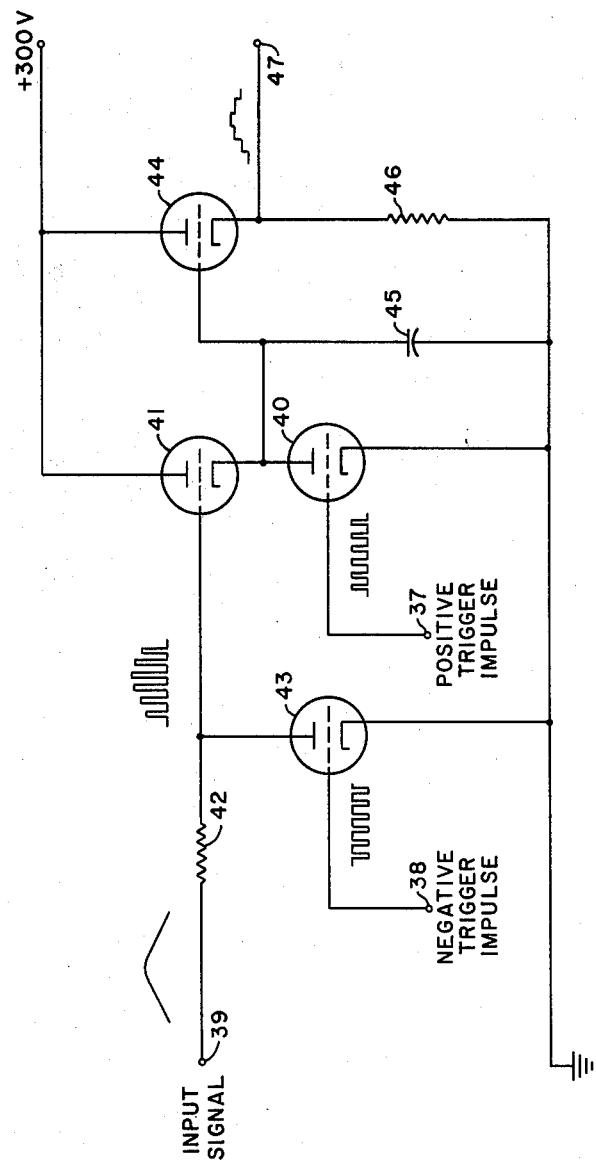
FIG. 2 is a schematic representation of a sampling circuit employed in the apparatus shown in FIG. 1.

The operation of the sample-and-hold circuit employed in the apparatus of FIG. 1 can better be understood by referring to FIG. 2 of the drawing, which is schematic diagram of this circuit. As can be seen from FIG. 2, each voltage sampling circuit employs four triodes, two resistors and a capacitor. Two of these triodes, triodes 40 and 43, could readily be replaced by diodes and appropriate control circuitry. Transistors might also be employed in place of electron tubes. The sampling action is activated by by the simultaneous application of positive and negative gate pulses from the multivibator connected to the sampling circuits through positive gate terminal 37 and negative gate terminal 38 in the sampling circuit. Since in the apparatus of FIG. 1 the triggering impulses are obtained from the five-stage ring counter, the ratio of the length of the impulses to the interval between impulses will be 1 to 4.

The signal to be sampled by the sampling circuit depicted in FIG. 2 of the drawing is fed into the circuit through terminal 39. Prior to the arrival of the input signal, triodes 40 and 41 are held cut off, triode 40 by the positive gate signal applied at terminal 37 and triode 41 by the drop across resistor 42 caused by current flow through triode 43. Triode 44 provides a low impedance replica of the voltage on storage condenser 45. When the signal to be sampled arrives at the sampling circuit, triode 43 is cut off, allowing the voltage on the grid of triode 41 to rise to the level of the input signal. Simultaneously, triode 40 is turned on, providing a cathode resistor for triode 41. Storage capacitor 45 is therefore charged to the new signal level. Immediately after the sample is stored on capacitor 45, triode 43 is turned on and triode 40 is cut off. This leaves capacitor 45 free floating, holding the grid of triode 44 at signal level. Triode 44 with cathode resistor 46 provides a low impedance output at terminal 47 for the storage capacitor signal. The output signal from the voltage sampling circuit is thus a stair- step representation of the input signal applied to the circuit. Each constant voltage portion of the output signal is of equal duration. This output signal serves as the input signal for the succeeding sampling circuit. It will be understood that the sampling circuit thus described is merely representative of circuitry useful in practicing the method of the invention and that the invention is not limited to the use of any particular sample-and-hold circuit. A number of other sample-and-hold circuits which might be employed in the apparatus of the invention with minor and obvious modifications are described in chapter 14 of "Waveforms" by Chance et al., vol. 19 of the Massachusetts Institute of Technology Radiation Laboratory Series, published by the McGraw-Hill Book Company of New York.

The input signal to be applied to the apparatus shown in FIG. 1 is fed into the apparatus from source 48 in FIG. 1. As will be pointed out in greater detail hereafter, this source will ordinarily constitute a magnetic tape or similar reproducible record and associated playback equipment or a variable frequency oscillator. Other signal sources may, however, be utilized. The signal from source 48 is fed into sampling circuit 17 where a stairstep representation of the signal is produced in the manner described in the preceding paragraph. The operation of sampling of circuit 17 is controlled by positive and negative gating impulses from bistable multivibrator 12 in the counting circuitry. The stairstep waveforms produced as an output signal from sampling circuit 17 is then passed to sampling circuit 18 where, in response to positive and negative gating impulses from bistable multivibrator 13, it is again sampled and held at the same frequency but at intervals displaced in time from the sampling intervals in the preceding sampling step. A sample of the output from sample-and-hold circuit 17 is recovered by means of delay tap 49. In the manner thus described, the signal applied to the series of sampling circuits proceeds through the circuits in order, each sampling circuit output signal serving as the input signal for the succeeding sampling circuit. Delayed voltage samples are recovered from each of the sampling circuits 17 through 36 by means of delay taps 49 through 68. Each voltage sample thus recovered is delayed from that preceding it in the series by a discrete time interval. The duration of this interval is determined by the frequency of the pulses emitted from source 11 and does not change so long as the pulse frequency is held constant.

Figure 3:
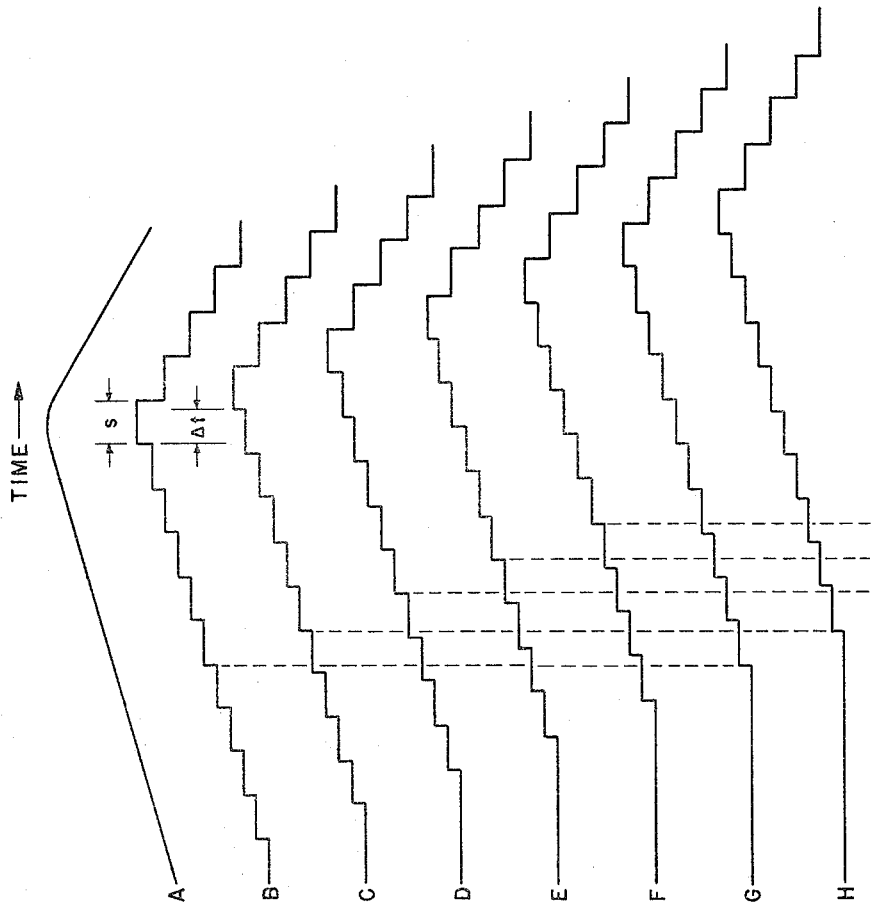
FIG. 3 represents waveforms helpful in understanding the method and apparatus of the invention.

The production of delayed voltage samples in the time domain unit employed in the apparatus of the invention can better be understood by examining the waveforms produced during that stage of the operation. Turning now to FIG. 3 of the drawing, the signal fed into the series of sampling circuits from source 48 is represented by waveform A of FIG. 3. Sampling and holding the voltage of this waveform at regular intervals whose frequency is at least twice the frequency of the highest component of the input signal results in a stairstep waveform of the type shown as waveform B in FIG. 3. This waveform consists of a series of constant voltage increments whose values are proportional to the voltage of the input signal at the instant each sample was taken. In order to produce such a stairstep waveform, the sampling frequency should exceed the highest frequency in the input signal by at least a factor of two and will preferably be four or more times greater than the highest input signal frequency. Waveform B is then fed into sampling circuit 18 where it is sampled and held at the same sampling frequency employed in sampling circuit 17. Due to the time lag between the triggering impulses emitted by bi-stable multivibrator 12 and those emitted by bistable multivibrator 13, sampling in circuit 18 occurs at a discrete time interval after sampling took place in the prior sampling circuit 17. A second stairstep waveform displaced from the first by a time period $\Delta t$ is thus produced. This period $\Delta t$ constitutes the delay period for one sampling stage of the apparatus. Similar stairstep waveforms, each delayed from the preceding by a time period Δt, a constant, are produced in the succeeding sample-and-hold circuits. These are shown in FIG. 3 as waveforms C, D, E, F and the like. The total delay of the last sample obtained through delay tap 68 is thus the product of Δt times the number of individual delay stages in the apparatus. Increasing the number of sampling stages in the filter apparatus obviously increases the total delay time obtained.

Sampling stages 17, 22, 27 and 32 in the apparatus of FIG. 1 are triggered simultaneously by impulses from bistable multivibrator or gate generator 12 and therefore operate in unison. In like manner, each of the other multivibrators in the ring counter circuitry depicted in the drawing triggers four sampling circuits. Every fifth sampling circuit therefore samples at the same time. Under these circumstances, the delay period Δt for each sampling stage or circuit will be four-fifths of the sampling period, S. The sampling period in seconds per cycle is the reciprocal of the sampling frequency in cycles per second. As pointed out previously, the sampling frequency is determined by the frequency of the pulses emitted by pulse source 11 and can be altered by varying the frequency of source 11. This relationship between the sampling period S and the delay period Δt will be the same for any apparatus employing a five-stage ring counting circuit. The relationship may be changed by changing the number of stages in the ring counter. In a ring counter employing four bistable multivibrators or gate generators, for example, every fourth sampling circuit in the series would be triggered simultaneously and hence the delay period would be three-fourths of the sampling period. It is thus obvious that the relationship between the delay period Δt and the sampling period S is governed by the number of gate generators or stages employed to control the apparatus and that the apparatus is not limited to the use of a five-stage ring counter or similar sequence-operated counting device as depicted in FIG. 1 of the drawing.

As pointed out heretofore, the sampling circuit shown in FIG. 2 of the drawing essentially involves two cathode follower stages. When a sampling device of this type is utilized, the amplitude of the output signal of each sampling circuit is somewhat lower than that of the input signal. In order to compensate for this loss in signal level, booster amplifiers may be provided at periodic intervals in the series of sampling circuits. Conventional amplifiers requiring only a small amount of gain may be employed for this purpose and may be heavily fed back in order to maintain stability throughout the amplified portion of the circuit. Amplifiers 69, 70 and 71 are provided for this purpose in the apparatus shown in FIG. 1 of the drawing.

The delayed voltage samples obtained through delay taps 49 through 68 in the apparatus of FIG. 1 are weighted and mixed in accordance with the output response desired from the apparatus. The weighting and mixing apparatus shown in FIG. 1 comprises series resistors 72 through 91 and a mixing resistor string containing mixing resistors 92 through 106. As shown in FIG. 1, the mixing resistor string consists of a network of horizontal and vertical leads which may be interconnected at any desired point in order to obtain the required system response. The horizontal leads in the mixing resistor string are interconnected through resistors 92 through 106. The series resistors 72 through 91 are preferably made much larger than mixing resistors 92 through 106 in order to prevent interaction of the weightings. The mixing resistors are selected so that each horizontal lead in the string corresponds to a known, fixed percentage of the total resistance of the string. By applying the proper resistance to each delayed signal recovered through delayed taps 49 through 68, any desired system output response may be patched into the system. A composite signal made up of the weighted delayed samples is recovered through lead 107.

In order to facilitate changes in the weightings applied to the delayed voltage samples by means of the mixing resistor string, it is often desirable to employ commercially available card programmed switches to interconnect the horizontal and vertical leads in the string. The use of such switches permits changes in the weightings by merely inserting a card having prearranged holes punched therein. The switches are normally in an open position and are closed at each point where a hole appears in the program card. This permits changes in weighting much more rapidly than is otherwise possible. The use of such switches and programming cards will be readily apparent to those skilled in the art.

In lieu of the mixing resistor strings shown in FIG. 1, other methods may be employed for weighting and mixing delayed voltage samples recovered from the sampling circuits. The use of variable resistors, for example, often affords a convenient weighting method where the number of delayed samples is relatively small. Where a large number of samples must be weighted and mixed, however, the card-programmed system described heretofore is preferred.

It should be understood that the method of the present invention is not restricted to the use of the particular time domain unit described in the preceding paragraphs and illustrated in FIGS. 1 through 3 of the drawing. Other time domain units which will permit the extraction of samples of an input signal at regular delayed intervals and the weighting and mixing of those samples in accordance with the predetermined system response may also be employed. Other types of time domain units useful in carrying out the method of the invention include rotating magnetic time domain units and lumped constant time domain units. In the rotating magnetic type unit, the input signal is modulated and applied to a magnetic recording medium carried on the surface of a rotating drum or cylinder. A series of spaced pickup heads and corresponding demodulation units are utilized to recover the signal at intervals as the drums rotate. The delayed samples thus recovered are then weighted and mixed in a manner generally similar to that described in conjunction with the apparatus shown in FIG. 1 of the drawing. Units of this type are reasonably effective for purposes of the invention but are somewhat restricted in application because of limitations upon the number of delay taps imposed by practical considerations of drum diameter and playback head size. Lumped constant time domain units consist essentially of conventional lumped constant inductance and capacitance elements arranged in a network and provided with delay taps at periodic intervals along the length of the network. Delayed voltage samples are recovered from the spaced delay taps and are weighted and mixed to produce the output signal. Apparatus of this latter type is generally restricted in application because of limitations in frequency response when large numbers of delay taps must be used. The time domain unit described in conjunction with FIGS. 1 through 3 of the drawing is relatively free of the disadvantages associated with rotating magnetic and lumped constant time domain apparatus and is therefore particularly preferred for purposes of the invention.

Figure 4:
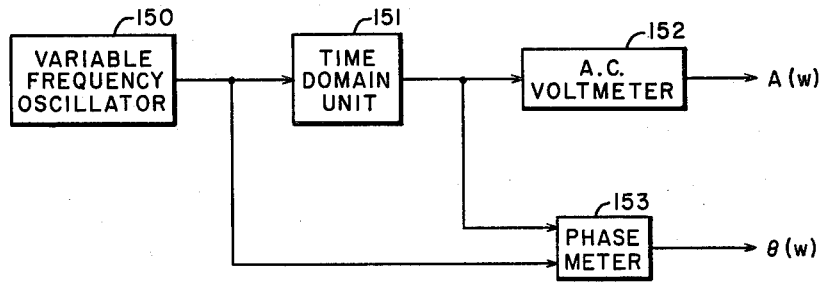
FIG. 4 represents apparatus, including the time domain unit shown in FIG. 1, for evaluating frequency components in a given waveform in accordance with the invention; and, FIG. 5 represents schematically apparatus, including the time domain unit shown in FIG. 1, for analyzing all intervals of an input signal for a given frequency component in accordance with the invention.

Reference is now made to FIG. 4 of the drawing which illustrates schematically apparatus, including the time domain unit described in detail in the preceding paragraphs, for evaluating frequency components in a given waveform in accordance with the invention. As will be apparent from what has been said heretofore, such an evaluation is made possible by the fact that a time domain unit can be employed to perform an integration corresponding to that required by the Fourier transforms. In carrying out such an integration, the waveform to be analyzed for its frequency components is considered as a system response, $G(w)$, and is employed to weight delayed samples of an input signal of preselected frequency, considered as $F(w)$.

The output signal obtained upon mixing of the delayed samples thus weighted corresponds to R(w), the component of the waveform having a frequency the same as that of the input signal. The apparatus thus employed performs the operation represented by the equation $$F(w) \times G(w) = R(w)$$

but utilizes time functions to represent the frequency functions normally employed. This obviates the necessity for employing the Fourier equations to carry out the analysis.

The apparatus in FIG. 4 of the drawing comprises variable frequency oscillator 150, time domain unit 151, A.C. voltmeter 152 and phase meter 153. The oscillator employed may be any of a number of conventional devices capable of producing a sinusoidal output signal having a frequency within the desired range. This range will, of course, depend upon the frequency content of the waveform to be analyzed. As pointed out earlier, time domain unit 151 will preferably be of the type described in conjunction with FIGS. 1 through 3 of the drawing. In lieu thereof, any time domain unit which will permit the extraction of voltage samples from an input signal at delayed time intervals and the weighting of those samples in a predetermined manner may be utilized. A.C. voltmeter 152 and phase meter 153 are conventional instruments used in the electrical and electronics fields and will be familiar to those skilled in the art. As indicated by FIG. 4, the output from variable frequency oscillator 150 serves as the input signal to time domain unit 151 and, is also applied to phase meter 153. Oscillator 150 in FIG. 4 thus corresponds to input signal source 48 in the time domain unit depicted in FIG. 1 of the drawing. The output signal from the time domain unit 151, corresponding to signal obtained through lead 107 in the time domain unit of FIG. 1, is applied to voltmeter 152 and phase meter 153. In lieu of the A.C. voltmeter and phase meter, an oscilloscope could be employed to determine the amplitude and phase response of the system. In this case this output from the time domain unit would be connected to the vertical terminal of the scope and the oscillator output shown in FIG. 4 as applied to phase meter 153 would instead be applied to the horizontal terminal of the scope.

In employing the equipment shown in FIG. 4 of the drawing, the waveform to be analyzed is utilized as the attenuation multipliers of the time domain unit. Although this waveform is actually a function of time, $f(t)$, for purposes of the analysis to be carried out it is considered as a network frequency function, $G(w)$. The mixing resistors in the time domain unit are interconnected so that the resistance used to mix each delayed sample extracted by the time domain unit is proportional to the amplitude of the waveform being analyzed at that sample point. The greater the amplitude of the waveform at any particular instant, the higher will be the resistance used to mix the delayed voltage sample taken at a time corresponding to that point in the waveform. The entire waveform is thus patched into the time domain unit in this manner.

Variable frequency oscillator 150 is set to deliver a sine wave having a frequency corresponding to the frequency of the component of the waveform patched into the time domain unit which it is desired to analyze. This sine wave is then fed to the time domain unit and to one terminal of phase meter 153. The delayed output signal obtained from the time domain unit, weighted by the waveform patched into the unit, is applied to the A.C. voltmeter 152 and to the other terminal of phase meter 153. The amplitude of the frequency component of the waveform corresponding to the oscillator frequency can then be read directly from the voltmeter. In like manner, the phase angle of that frequency component is indicated by phase meter 153. Other frequency components of the waveform being analyzed can be treated in similar manner by adjusting the oscillator to deliver since waves having the desired frequencies.

It will be obvious that the interval of the waveform under investigation which can be analyzed with a single setting of the time domain unit attenuation multipliers depends upon the number of sampling stages and the overall delay period of the time domain unit. For this reason, the use of time domain units having large numbers of sampling stages and long overall delay periods is advantageous. As pointed out heretofore, time domain units having 250 or more sampling stages and overall delay periods of 500 milliseconds or more may be employed.

The preceding paragraphs disclose a method for evaluating individual frequency components within a complex time function. It will be apparent that this is essentially a solution of the Fourier transform defining a frequency function in terms of the corresponding time function. As such, the method may be used to obtain transformations between time and frequency for any complex electrical signal.

The method and apparatus of the invention may also be used to define a function of time, $f(t)$, when the corresponding function of frequency, $F(w)$, is known. In order to carry out this inverse transformation, the relationship between the frequency of oscillator 150 and time intervals in the time function to be determined must be understood. The overall delay period of the time domain unit depends upon the delay time between individual delay taps of the unit and upon the number of such taps in the unit. This is a matter of interchanging frequency and time in the Fourier transforms. Analysis of this interchange shows that if a frequency function is programmed in the time domain unit at steps of $\Delta f$, then steps of $\Delta f$ on the oscillator input will give a time domain unit output at steps of $\Delta t$. $\Delta t$ is the incremental delay between taps on the time domain unit. If the oscillator frequency is a multiple of the frequency interval selected in programming $F(w)$ on the unit, a value of $f(t)$ will be obtained for a time which is equivalent to that multiple times the delay period between taps. From this it can be seen that oscillator settings equivalent to the frequency interval at which $F(w)$ is programmed into the time domain unit will produce values of $f(t)$ at intervals corresponding to the delay periods between taps. This permits solution of the inverse Fourier transform.

By expanding the inverse transform expressing functions of time in terms of the corresponding functions of frequency, a complex integral having real and imaginary parts is obtained as shown below:

$$f(t) = \frac{1}{2\pi}\int_{-\infty}^{\infty} F(w) e^{-itw} dw = \frac{2}{1\pi}\int_{-\infty}^{\infty}[F_1(w) \cos tw - F_2(w) \sin tw]dw + \frac{1}{2\pi}\int_{-\infty}^{\infty}[F_1(w) \sin tw + F_2(w) \cos tw]dw$$

In the above equation, the imaginary part of the integral expression is composed of odd functions of $w$ and therefore integrates to 0. This satisfies the requirement that $f(t)$ be real for physical systems. $F_1(w)$ and $F_2(w)$ are the transforms of $f_1(t)$ and $f_2(t)$, components of a time function $f(t)$ which is neither even or odd. In such a function, $f_1(t)$ must be even and $f_2(t)$ must be odd. This is indicated by the fact that the real part of the integral shown above has two parts, the first of which is even in $t$ and the second of which is odd in $t$. In view of this, $F_1(w)$ can be patched into the attenuation multipliers of a time domain unit and values of $f_1(t)$ can be read by means of voltmeter 152 in the apparatus of FIG. 4. Values of $-F_2(w)$ can then be set into the time domain unit and values of $f_2(t)$ can be read on voltmeter 152. The value of $f(t)$ is the sum of $f_1(t)$ and $f_2(t)$. Corresponding values for $f(t)$ for negative times can be calculated because of the even and odd characteristics of $f_1(t)$ and $f_2(t)$. The apparatus shown in FIG. 4 of the drawing thus permits the taking of either of the Fourier transforms within the limits of the length of the delay system provided by the time domain unit.

If the overall delay period of the time domain unit utilized is insufficient to permit the setting in of values of $F_1(w)$ and $F_2(w)$, these values can be patched into the system as attenuation multipliers for only a positive frequency value. If this is done, one half $F_1(t)$ will be obtained as the peak output on voltmeter 152 multiplied by the cosine of the phase angle. In lieu of the voltmeter, an oscilloscope having the delayed signal from time domain unit 151 connected to the vertical terminal and the oscillator signal from oscillator 150 connected to the horizontal terminal may be used. The maximum horizontal displacement on the oscilloscope indicates the point at which $F_1(w)$ is multiplied by the cosine. The value of the vertical displacement on the scope at this instant is the desired integral giving one-half $f_1(t)$.

In the special case of a minimum phase characteristic of where the function of time is known to exist only for time values equal to or greater than 0 the procedure for taking the inverse Fourier transform to obtain values of the time function is greatly simplified. The applicable Fourier transform covering this operation can be expanded as shown below:

$$f(t) = \frac{2}{\pi} \int_0^\infty F_1(w) \cos twdw = \frac{-2}{\pi} \int_0^\infty F_2(w) \sin twdw$$

Integration of either of the expressions on the right-hand side of the equation will give values of the time function. Either of the integral forms may be employed as the attenuation multipliers on the time domain unit. Either positive or both positive and negative values of frequency in either equation may be used. If both positive and negative values of frequency are employed, values of the time function can be read directly from voltmeter 152 in the apparatus of FIG. 4. If only positive values of frequency in the integral expressions are used, an oscilloscope must be employed to obtain values of the time function in the manner described in the preceding paragraphs or else values read on voltmeter 152 must be modified by the indicated phase angle.

Figure 5:
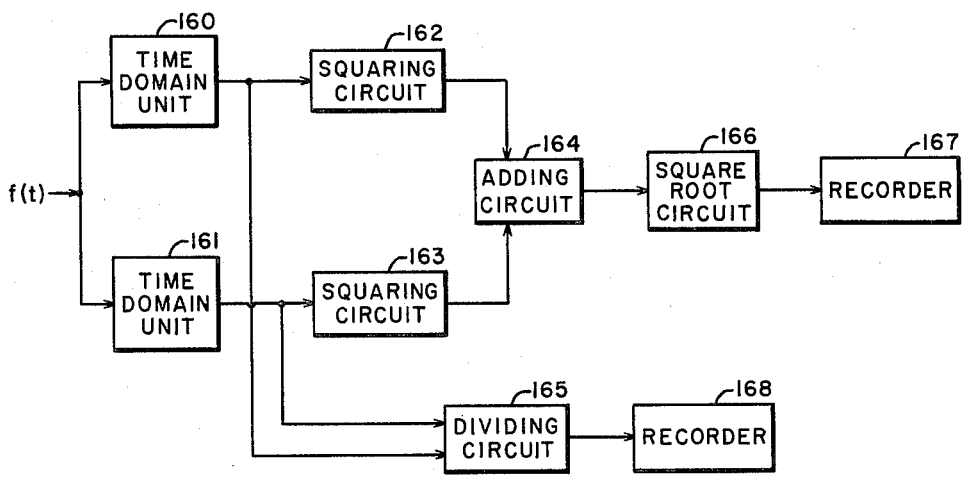

The apparatus shown in FIG. 5 of the drawing may be employed in accordance with the invention for analyzing all intervals of the complex time function for a given frequency component with a single pass of the signal through the apparatus. This obviates the necessity for separate handling of individual intervals of the signal and hence greatly accelerates the analytical process. The operation performed by the apparatus shown in FIG. 5 can best be understood by further considering the basic Fourier transform defining a frequency function in terms of the corresponding time function. This transform can be expanded as follows:

$$F(w) = \int_{-\infty}^\infty f(t) \cos wtdt + i \int_{-\infty}^\infty f(t) \sin wtdt$$

The above equation indicates that values of the sine and cosine component of a given frequency component of the frequency function corresponding to the given time function can be obtained by attenuating delay samples of the time function by the sine and cosine of the selected frequency and thereafter totaling the outputs. Since a frequency function can be represented by the equation:

$$F(w) = A(w)^{i\varphi w}$$

where $A(w)$ is the signal amplitude and $\varphi(w)$ is the phase angle, it will be seen that values of the amplitudes and phase angle of the frequency function can be obtained if sine and cosine values of $(wt)$ are known. Signal amplitude can be determined by taking the square root of the sum of the squares of the sine and cosine values. The phase angle can be found by using the relationship that the tangent of the phase angle is defined by the ratio of the amplitude of the sine $wt$ to the amplitude of the cosine $wt$. This permits a continuous analysis of a time function for a given frequency component.

The apparatus shown in FIG. 5 which is used in carrying out the operation described above comprises time domain units 160 and 161, squaring circuits 162 and 163, adding circuit 164, dividing circuit 165, square root circuit 166 and recorders 167 and 168. Time domain units 160 and 161 are preferably of the type described in conjunction with FIGS. 1 through 3 of the drawing but may be rotating magnetic or lumped constant units designed to permit the extraction of voltage samples at delayed time intervals and the weighting and mixing of the samples extracted in accordance with a predetermined system response. The other components of the apparatus of FIG. 5 are conventional circuits widely used in computers in other electronic applications and will be familiar to those skilled in the art.

The time function to be analyzed by the apparatus shown in FIG. 5 of the drawing is simultaneously fed into time domain units 161 and 162. In units such as that shown in FIG. 1 of the drawing, the time function serves as the input signal fed from source 48 in FIG. 1. The mixing resistors of time domain unit 160 are adjusted to give an output response of cos $wt$, where $w$ is determined by the frequency component for which the time function is to be analyzed. In like manner, sin $wt$ is employed as the attenuation multiplier in time domain unit 161. Voltage samples of the time function fed to the time domain units are taken at delayed time intervals and are weighted in accordance with the attenuation multiplier set into the units. An output signal equivalent to sin $wt$ for the selected frequency component of the input time function is obtained from time domain unit 160. The output signal from time domain unit 161 represents cos $wt$ of the selected frequency component of the input time function. These output signals are squared in squaring circuits 162 and 163 and then added in adding circuit 164. The square root of the sum of the squares thus obtained is taken in square root circuit 166. The output signal from this circuit is equivalent to the frequency function component amplitude. The value thus obtained can be recorded on a suitable recording device 167. Any conventional device used to record electrical signals, an oscillograph for example, may be employed. Instantaneous values of the amplitude can be read directly from a suitable voltmeter or oscilloscope connected to the square root circuit.

The output signals from time domain units 160 and 161, representing respectively the amplitude of sin $wt$ and the amplitude of cos $wt$ for the frequency component of the frequency function corresponding to the input time function, are fed to dividing circuit 165 where the amplitude of sin $wt$ is divided by the amplitude of cos $wt$. The output signal from the dividing circuit represents the tangent of the phase angle of the preselected frequency component of the frequency function corresponding to the input time function. This signal may be recorded upon a suitable recorder 168. The angle itself can readily be determined by taking the inverse tangent of the recorded value. Instantaneous values of the tangent of the phase angle can be read directly from a meter or scope connected to the dividing circuit.

From the foregoing it can be seen that the method and apparatus of the present invention provide a means for carrying out Fourier analyses of complex electrical systems without the necessity for direct mathematical calculations using the Fourier relationships. This greatly accelerates such analytical operations and dispenses with the requirement that a computer or graphical method be utilized. It will be understood that numerous modifications in the precise operating steps and apparatus disclosed herein may be made without departing from the scope of the invention.

What is claimed is:

1. A method for obtaining the inverse Fourier transform of a complex electrical frequency function which comprises sampling a sine wave of known frequency at regular delayed time intervals whose frequency exceeds the known frequency of said sine wave by a factor of at least two, attenuating the delayed samples in proportion to the amplitude values of said frequency function at frequency intervals corresponding to the known frequency of said sine wave by passing each of said samples through one of a plurality of resistance elements, and combining the attenuated samples to obtain a composite signal representing said inverse Fourier transform.

2. A method for obtaining a Fourier transform of a complex electrical time function which comprises extracting sample voltages from a sine wave of known frequency at delayed time intervals whose frequency exceeds the known frequency of said sine wave by a factor of at least two, attenuating each of said delayed samples in proportion to the amplitude of said time function at a time corresponding to the time said sample was taken by passing said sample through one of a plurality of resistance elements, and mixing the attenuated samples to obtain a composite output signal corresponding to said Fourier transform.

3. A method for determining the amplitude and phase angle of a preselected frequency component of a complex electrical time function which comprises sampling said time function at regular delayed time intervals whose frequency is at least twice the highest frequency in said time function, weighting and mixing said delayed samples to produce a first composite signal corresponding to the amplitude of the cosine of said preselected frequency component, weighting and mixing said delayed samples to produce a second composite signal corresponding to the amplitude of the sin of said preselected frequency component, dividing said second composite signal by said first composite signal to obtain the tangent of the phase angle of said preselected frequency component, and taking the square root of the sum of the squares of said first and second composite signals to obtain the amplitude of said composite signal.

4. A method for carrying out a running frequency analysis of a complex electrical signal which comprises weighting a first series of delayed voltage samples extracted from said complex signal in proportion to the cosine of a preselected frequency at time intervals corresponding to the time intervals at which said delayed voltage samples were taken, mixing the weighted voltage samples in said first series to produce a first composite signal, weighting a second series of delayed voltage samples extracted from said complex signal in proportion to the sine of said preselected frequency at time intervals at which said delayed voltage samples were taken, mixing the weighted delayed voltage samples in said second series to produce a second composite signal, squaring and adding said first and said second composite signals, taking the square root of the sum of the squares of said first and second composite signals, and dividing said second composite signal by said first composite signal.

5. A method for obtaining a Fourier transform of a complex electrical signal which comprises sequentially sampling a sine wave of known frequency in a series of sampling stages at periodic time intervals, the output from each of said sampling stages serving as the input for the succeeding stage and the sampling frequency exceeding the frequency of said sine wave by a factor of at least two; recovering a delayed voltage sample from each of said sampling stages; attenuating each of said delayed voltage samples as a function the amplitude of said complex signal at a time corresponding to the time at which said sample was recovered by passing said sample through one of a plurality of preset variable resistance elements; mixing the attenuated delayed samples; and recovering a composite signal corresponding to said Fourier transform of said complex signal.

6. A method for producing an inverse Fourier transform of a complex frequency function which comprises sequentially sampling a sine wave of known frequency in a series of sampling stages at periodic time intervals, the output from each sampling stage serving as the input for the succeeding stage and the sampling frequency exceeding the frequency of said sine wave by a factor of at least two; recovering a delayed voltage sample from each sampling stage; attenuating each of said delayed voltage samples as a function of the amplitude of said complex frequency function at frequency intervals corresponding to the known frequency of said sine wave by passing said sample through one of a plurality of preset variable resistance elements; mixing the attenuated delayed voltage samples; and recovering a composite signal corresponding to said inverse Fourier transform.

7. Apparatus for the Fourier analysis of a complex electrical signal comprising in combination a source productive of a sinusoidal signal having preselected amplitude and frequency characteristics; a time domain unit including a source of periodic impulses, a ring counter productive of gating signals in response to impulses from said source of periodic impulses, a series of sample-and-hold circuits sequentially responsive to signals from said ring counter for sampling said sinusoidal signal at delayed time intervals, delay taps from said sample-and-hold circuits, and a mixing resistor string for weighting delayed samples of said sinusoidal signal by values of said complex signal considered as an impulse response and mixing samples so weighted to produce a transform of said complex signal; and means for measuring the amplitude and phase characteristics of said transform.

8. Apparatus for defining preselected frequency components of a complex electrical time function which comprises in combination a variable frequency oscillator, a plurality of sample-and-hold circuits connected in series with said oscillator, means for triggering said sample-and-hold circuits in sequence, delay taps for recovering delayed voltage samples from said sample-and-hold circuits, a mixing resistor string connected to said delay taps for weighting said delayed samples with values of said time function and combining the weighed samples, means for measuring the amplitude of the output signal from said mixing resistor string, and means for measuring the phase angle of the output signal from said mixing resistor string.

9. Apparatus for carrying out a running frequency analysis of a complex electrical signal comprising in combination first and second time domain units including components for extracting delayed voltage samples from said signal, weighting said samples, and combining the weighted samples to produce first and second composite signals; a first squaring circuit in series with said first time domain unit; a second squaring circuit in series with said second time domain unit; adding circuitry for combining the outputs from said first and second squaring circuits; a square root circuit in series with said adding circuit; a dividing circuit for dividing the output of said first time domain unit by the output of said second time domain unit; and means for recording the output signals from said square root circuit and said dividing circuit.

10. Apparatus as defined by claim 9 wherein said first and second time domain units each include a source of periodic impulses, a ring counter productive of gating signals in response to impulses from said source, a series of sample-and-hold circuits sequentially responsive to gating signals from said ring counter, delay taps from said sample-and-hold circuits, a network of interconnected resistance elements for weighting and mixing the signals from said delay taps, and an output terminal for recovering a composite signal from said network.

(References on following page)

References Cited by the Examiner

UNITED STATES PATENTS

| | | | |
|---|---|---|---|
| 2,263,376 | 11/41 | Blumlein et al. | 333—70 |
| 2,397,961 | 4/46 | Harris. | |
| 2,522,369 | 9/50 | Guanella | 324—77 |
| 2,716,733 | 8/55 | Roark | 333—29 X |
| 2,752,092 | 6/56 | McDonal. | |
| 2,841,332 | 7/58 | Lees | 235—183 |
| 2,897,442 | 7/59 | Wright et al. | 324—77 |
| 2,916,724 | 12/59 | Peterson. | |
| 2,923,891 | 2/60 | Nicholson | 332—23 X |
| 2,942,195 | 6/60 | Dean | 333—70 X |
| 2,954,465 | 9/60 | White | 324—77 |
| 2,963,647 | 12/60 | Dean | 324—77 |
| 2,980,871 | 4/61 | Cox | 333—70 X |
| 3,009,106 | 11/61 | Haase | 324—77 |
| 3,013,209 | 12/61 | Bickel et al. | 324—77 |
| 3,026,475 | 3/62 | Applebaum | 324—77 |
| 3,036,268 | 5/62 | Smith | 324—77 |

OTHER REFERENCES

"Correspondence," Proceedings of the I.R.E., June 1956, vol. 44, No. 6, p. 820.

"Frequency Analyzer Uses Two Reference Signals," Electronics, May 1, 1959, pp. 56–57.

"Practical Applications of Time Domain Theory," Bell Telephone System Technical Publications, Monograph 3404, 1959 I.R.E. Wescon Convention Record, part 3, pp. 29–38.

"Synthesis of Characteristics," Elektrosvyoz, 1958, M. 3, pp. 3–10.

WALTER L. CARLSON, *Primary Examiner.*

SAMUEL BERNSTEIN, *Examiner.*